US012691422B2

(12) United States Patent
Wen et al.

(10) Patent No.: US 12,691,422 B2
(45) Date of Patent: Jul. 28, 2026

(54) FILTRATION MEMBRANE AND METHOD OF PRODUCTION THEREOF

(71) Applicants: NewSouth Innovations Pty Limited, Sydney (AU); Sydney Water Corporation, Parramatta (AU)

(72) Inventors: Xinyue Wen, Sydney (AU); Yi You, Sydney (AU); Xiaoheng Jin, Sydney (AU); Heriberto Bustamante, Parramatta (AU); Rakesh Joshi, Sydney (AU)

(73) Assignees: Newsouth Innovations Pty Limited, Sydney (AU); Sydney Water Corporation, Parramatta (AU)

( * ) Notice: Subject to any disclaimer, the term of this patent is extended or adjusted under 35 U.S.C. 154(b) by 584 days.

(21) Appl. No.: 17/618,203

(22) PCT Filed: Jun. 11, 2020

(86) PCT No.: PCT/AU2020/050593
§ 371 (c)(1),
(2) Date: Dec. 10, 2021

(87) PCT Pub. No.: WO2020/248017
PCT Pub. Date: Dec. 17, 2020

(65) Prior Publication Data
US 2022/0274064 A1 Sep. 1, 2022

(30) Foreign Application Priority Data
Jun. 12, 2019 (AU) ................................ 2019902045

(51) Int. Cl.
*B01D 71/02* (2006.01)
*B01D 61/14* (2006.01)
(Continued)

(52) U.S. Cl.
CPC ........ *B01D 71/0211* (2022.08); *B01D 61/147* (2013.01); *B01D 61/18* (2013.01);
(Continued)

(58) Field of Classification Search
None
See application file for complete search history.

(56) References Cited

U.S. PATENT DOCUMENTS 10,442,709 B2 * 10/2019 Zheng ................... B01D 69/12
2002/0092809 A1 7/2002 Ries et al.
2016/0297693 A1 10/2016 Raveendran-Nair et al.

FOREIGN PATENT DOCUMENTS

CN 105727758 A 7/2016
CN 108722206 A 11/2018
(Continued)

OTHER PUBLICATIONS

Jia et al., "Covalently crosslinked graphene oxide membranes by esterification reactions for ions separation," J. Mater. Chem. A, 2015, 3, 4405-4412 (Year: 2015).*
(Continued)

*Primary Examiner* — Krishnan S Menon
(74) *Attorney, Agent, or Firm* — Myers Bigel, P.A.

(57) ABSTRACT

A composite membrane is disclosed that comprises a porous polyvinylidene fluoride (PVDF), polytetrafluoroethylene (PTFE) or nitrocellulose membrane body. The membrane also comprises graphene oxide disposed on a surface of the membrane body. An array comprising two or more such composite membranes is also disclosed. A method of preparing the composite membrane is also disclosed. Further, a method of removing natural organic matter (NOM) from NOM-contaminated water, or water suspected of being contaminated with NOM, is disclosed.

10 Claims, 10 Drawing Sheets

Graphite      Graphite oxide      Graphene oxide solution

(51) Int. Cl.

| | |
|---|---|
| *B01D 61/18* | (2006.01) |
| *B01D 63/02* | (2006.01) |
| *B01D 69/10* | (2006.01) |
| *B01D 69/12* | (2006.01) |
| *B01D 71/20* | (2006.01) |
| *B01D 71/34* | (2006.01) |
| *B01D 71/36* | (2006.01) |
| *C02F 1/44* | (2023.01) |
| *C02F 101/30* | (2006.01) |

(52) U.S. Cl.

CPC ............. *B01D 63/02* (2013.01); *B01D 69/10* (2013.01); *B01D 69/1213* (2022.08); *B01D 71/20* (2013.01); *B01D 71/34* (2013.01); *B01D 71/36* (2013.01); *C02F 1/444* (2013.01); *B01D 2323/30* (2013.01); *B01D 2325/12* (2013.01); *B01D 2325/24* (2013.01); *C02F 2101/30* (2013.01); *C02F 2303/20* (2013.01)

(56) References Cited

FOREIGN PATENT DOCUMENTS

| | | | |
|---|---|---|---|
| CN | 108854565 | A | 11/2018 |
| CN | 109289546 | A | 2/2019 |
| JP | 2016522737 | A | 8/2016 |
| JP | 2018532579 | A | 11/2018 |
| KR | 101986437 | B1 | 6/2019 |
| WO | 2014168629 | A1 | 10/2014 |
| WO | 2015003880 | A1 | 1/2015 |
| WO | 2017044845 | A1 | 3/2017 |
| WO | 2017201482 | A1 | 11/2017 |
| WO | 2019028280 | A1 | 2/2019 |
| WO | 2019106344 | A1 | 6/2019 |

OTHER PUBLICATIONS

"International Preliminary Report on Patentability corresponding to International Application No. PCT/AU2020/050593 mailed Oct. 1, 2021".

"International Search Report and Written Opinion corresponding to International Application No. PCT/AU2020/050593 mailed Aug. 20, 2020".

Baskoro, Febri , et al., "Ultrathin Graphene Oxide Composite Membrane for Water Purification", 12th World Filtration Congress, Taipei (Apr. 2016) 7 pages.

* cited by examiner

GO Solution     Hollow Fiber

Vacuum
Pump

Step 1: wetting

Step 2: cross-linking

Step 3: coating

FILTRATION MEMBRANE AND METHOD OF PRODUCTION THEREOF

CROSS-REFERENCE TO RELATED APPLICATIONS

This application is a 35 U.S.C. § 371 national phase application of PCT Application PCT/AU2020/050593, filed Jun. 11, 2020, which claims the benefit of priority of Australian Application No. 2019902045, filed Jun. 12, 2019, the entire contents of each of which are incorporated herein by reference in its entirety for all purposes.

TECHNICAL FIELD

This disclosure relates to filtration membranes and methods of producing filtration membranes. More particularly, this disclosure relates to water filtration membranes that may be used to remove natural organic matter (NOM) from water contaminated with NOM. The membranes may find particular, though not exclusive, use in commercial water treatment plants. Although described primarily in this context, it will be appreciated that the membranes may find use in a wide range of applications where removal of NOM from water is desirable.

BACKGROUND

Natural organic matter (NOM) is found in virtually all surface, ground and soil waters. Aquatic NOM is typically derived both from the breakdown of decaying plants (including algae) and animal matter. NOM is a complex matrix of organic materials present in virtually all bodies of water in the environment. Commonly, it includes carboxylic acids, carbohydrates, proteins and humic substances. In the context of town water supply, NOM impacts on the efficiency and effectiveness of water treatment processes and on the final water quality reaching a customer's tap. An increase in the amount of NOM has been observed over the past 10-20 years in raw water supplies globally, which has a significant effect on treatment processes for town water supply.

The presence of NOM causes many problems in drinking water and drinking water treatment processes, including (i) negative effect on water quality by causing colour, taste and odour problems, (ii) increased coagulant and disinfectant doses (which in turn results in increased sludge volumes and to the production of disinfection by-products (DBPs) that are regulated), and (iii) promotion of biological growth in distribution systems.

Current water filtration systems typically use chemical coagulants and activated carbon adsorption to remove NOM. Nevertheless, their use is not always effective; sometimes only achieving up to 50% NOM removal. Changes in the complexity and abundance of NOM have impacted the performance of direct filtration plants, resulting in reduced treatment capacity. For example, one water treatment plant in Australia has experienced reductions in processing capacity of around 40% after heavy rain events (which increase NOM in the raw water entering the plant). The duration of reduced processing capacity is sometimes unpredictable and may last as long as several weeks. Failure to successfully control the problems associated with NOM can result in additional expense to water treatment processing. There is clearly a need for new and alternative devices and methods for removal of NOM from NOM contaminated water.

It would be advantageous to provide alternative devices for the removal of NOM from water, especially devices that can be used to remove a significant portion of NOM from NOM-contaminated water to thereby provide water with little or no NOM contaminants. It would also be advantageous to provide devices that can be retrofitted into existing water filtration plants.

SUMMARY OF DISCLOSURE

Disclosed herein is a composite membrane comprising:
a porous polyvinylidene fluoride (PVDF), polytetrafluoroethylene (PTFE) or nitrocellulose membrane body; and
graphene oxide disposed on a surface of the membrane body.

In some embodiments, at least a portion of the graphene oxide may be bound to the membrane body via a crosslinking agent. In some particular embodiments, at least a portion of the graphene oxide may be covalently bound to the membrane body via a crosslinking agent. In some particular embodiments, the crosslinking agent may be selected from 1,5-pentanediol, glutaraldehyde and glycol. In some embodiments, the graphene oxide may be in the form of a layer. In some embodiments, the layer may be a substantially continuous layer coating a surface of the membrane body. In some embodiments, the graphene oxide may have a C/O ratio in the range of from about 2.1 to about 4.5. In some particular embodiments, the porous membrane body may be a porous polyvinylidene fluoride (PVDF) membrane body. In some embodiments, the composite membrane may be in the form of a hollow fiber composite membrane. In some particular embodiments, the graphene oxide may be disposed on an outer surface of the hollow fiber membrane.

Also disclosed herein is an array comprising two or more composite membranes as set forth herein, the two or more composite membranes arranged in parallel in the array.

Also disclosed herein is a method of preparing a composite membrane, the method comprising:
(a) providing a porous polyvinylidene fluoride (PVDF), polytetrafluoroethylene (PTFE) or nitrocellulose membrane body; and
(b) filtering a dispersion comprising graphene oxide through the membrane body such that the continuous phase of the dispersion passes through a surface of the membrane body, thereby depositing graphene oxide on the surface of the membrane body.

In some embodiments, the continuous phase of the dispersion comprising graphene oxide may comprise at least 50% v/v ethanol. In some embodiments, the method may further comprise an additional step, step (a1), before step (b) in which the porous membrane body may be treated with a solvent to remove, completely or at least partially, any protective coating that may be present on the membrane body. In some embodiments, the method may further comprise an additional step, step (a2), after step (a) or step (a1), when included, and before step (b), in which the porous membrane body may be contacted with a crosslinking agent.

This disclosure also provides a composite membrane prepared by the method as set forth herein.

Also disclosed herein is a method of removing NOM from NOM-contaminated water, or water suspected of being contaminated with NOM, the method comprising passing the NOM-contaminated water, or water suspected of being contaminated with NOM, through a composite membrane as set forth herein, a composite membrane prepared by the method as set forth herein or an array as set forth herein.

BRIEF DESCRIPTION OF THE FIGURES

Specific embodiments of the present disclosure are described below, by way of example only, with reference to the accompanying drawings in which.

DETAILED DESCRIPTION OF SPECIFIC EMBODIMENTS

Figure 1:
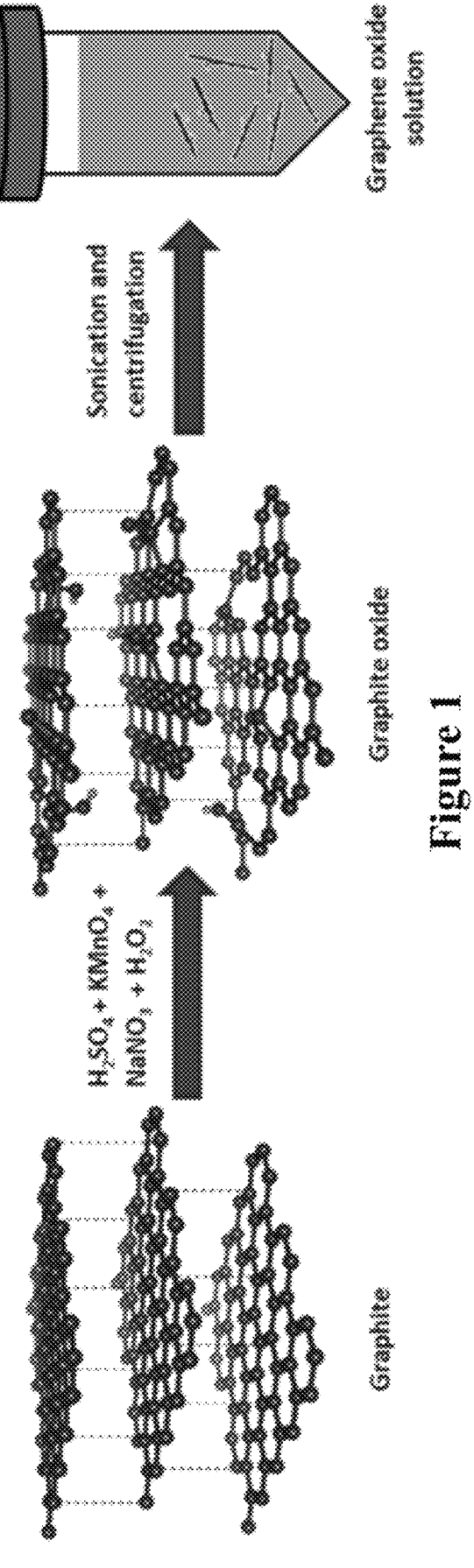
FIG. 1 is a schematic representation of the preparation of graphene oxide (GO) as described in Example 1.

Particular embodiments will now be described, by way of example only.

In a first aspect, the present disclosure provides a composite membrane comprising:

a porous polyvinylidene fluoride (PVDF), polytetrafluoroethylene (PTFE) or nitrocellulose membrane body; and graphene oxide disposed on a surface of the membrane body.

The composite membrane is typically used for water filtration. As such, the porous membrane body should be porous to allow the passage of water through the membrane body. In some embodiments, the porous membrane body is planar or substantially planar. In other embodiments, the porous membrane body is in the form of a hollow fiber (HF), sometimes referred to as a "hollow fiber membrane" (HFM). As will be appreciated, the form of the porous membrane body may be used to dictate the form of the composite membrane. As such, in some embodiments, the composite membrane is planar or substantially planar. In other embodiments, the composite membrane is a hollow fiber composite membrane.

In some particular embodiments, the porous membrane body is a porous polyvinylidene fluoride (PVDF) membrane body (i.e. a porous membrane body formed of PVDF). In other particular embodiments, the porous membrane body is a polytetrafluoroethylene (PTFE) membrane body. In yet other particular embodiments, the porous membrane body is a nitrocellulose membrane body. There exist many suppliers that manufacture membranes that may be suitable for use as a porous membrane body to support graphene oxide disposed on a surface of the membrane body. Advantageously, as the composite membrane can be prepared from commercially available and commercially used membranes of standard sizes, the composite membrane may be used to retrofit existing water treatment plants without the need for extensive redesign and adaptation of the water treatment plant.

In some embodiments, the porous membrane body has a pore size in the range of from about 0.002 $\mu m$ to about 2 $\mu m$, for example, from about 0.005 $\mu m$ to about 1 $\mu m$, from about 0.01 $\mu m$ to about 0.5 $\mu m$, from about 0.02 $\mu m$ to about 0.2 $\mu m$ or from about 0.05 $\mu m$ to about 0.15 $\mu m$. Porous membrane bodies are typically supplied by a manufacturer having a specified pore size.

Graphene oxide (GO) is sometimes referred to in the literature as graphite oxide, graphitic oxide or graphitic acid. Thus, "graphene oxide" is intended herein to embrace all such nomenclature. Advantageously, GO allows water to pass through it whilst NOM cannot pass through it. This property makes GO suitable for use in separating NOM from water. In addition, it has been observed that when GO is disposed on the surface of a membrane body, a stable composite membrane is able to be provided that can be used to remove NOM from NOM contaminated water.

GO is typically obtained by treating graphite with a strong oxidant. The laminar structure of graphite is typically retained in the oxidation process, however, the spacing between layers is typically much larger and irregular in GO than in graphite. GO typically comprises carbon, oxygen and hydrogen, with the ratio between these elements varying depending on the oxidation level of the GO. In its most oxidised form, GO may have a C/O ratio of as low as 2.1. In some embodiments, the GO has a C/O ratio in the range of from about 2.1 to about 5. In some embodiments, the C/O ratio is in the range of from about 2.2 to about 4.5, for example, from about 2.2 to about 4, from about 2.2 to about 3.5, from about 2.2 to about 3.0 or from about 2.2 to about 2.5.

In the composite membrane of this disclosure, graphene oxide is disposed on a surface of the membrane body. In embodiments where the membrane body is a hollow fiber membrane, the graphene oxide may be disposed on an inner surface, on an outer surface, or on both an inner and an outer surface of the hollow fiber membrane. In some particular embodiments, the graphene oxide is disposed on an outer surface of the hollow fiber membrane. Embodiments wherein the graphene oxide is disposed on an outer surface of the hollow fiber membrane may have certain advantages, such as ease of manufacture (e.g. to obtain more uniform GO deposition on the outer surface) and may be easier to assess (e.g. to identify any flaws in the GO). The outer surface also has a greater surface area than the inner surface, which may be beneficial in terms of increasing the GO surface area per HFM.

In some embodiments, the graphene oxide is in the form of flakes. In other embodiments, the graphene oxide is in the form of nanosheets. In some embodiments, the graphene oxide is in the form of a layer comprising graphene oxide flakes and/or nanosheets.

In some embodiments, the graphene oxide that is disposed on a surface of the membrane body is in the form of a layer. The layer may be described as a coating or a membrane. In some embodiments, the layer is a continuous layer coating a surface of the membrane body. The continuous layer extends over an entire surface of the membrane body such that, in use, the permeate (typically water) that passes through the composite membrane must pass through both the GO layer and the porous membrane body. In other embodiments, the layer is a discontinuous layer. In such embodiments, there may be gaps, fractures or holes in the graphene oxide layer such that, in use, the permeate (typically water) that passes through the composite membrane may pass through both the GO layer and the porous membrane body or may pass through only the porous membrane body. As will be appreciated, it is preferred that the GO is in the form of a continuous layer, rather than a discontinuous layer, as the GO layer is typically effective in sequestering or otherwise removing contaminants (e.g. NOM) that the porous membrane body typically cannot remove. Whilst not a preferred embodiment, discontinuous layers may nonetheless prove useful in terms of removing at least a portion of the contaminants (such as NOM) from contaminated water in applications that do not require extensive removal of the contaminants. In addition, embodiments having a discontinuous GO layer may have a higher flux compared to embodiments having a continuous GO layer.

In some embodiments the graphene oxide is in the form of a layer having a thickness in the range of from about 0.5 $\mu$m to about 20 $\mu$m (e.g. from about 1 $\mu$m to about 12 $\mu$m, from about 1 $\mu$m to about 10 $\mu$m, from about 1 $\mu$m to about 8 $\mu$m, from about 1 $\mu$m to about 5 $\mu$m, from about 2 $\mu$m to about 12 $\mu$m, from about 2 $\mu$m to about 10 $\mu$m, from about 2 $\mu$m to about 8 $\mu$m, from about 3 $\mu$m to about 12 $\mu$m or from about 3 $\mu$m to about 10 $\mu$m). In some embodiments, the thickness is substantially uniform, wherein 90% of the GO layer (based on the surface area of the GO) has a thickness of within 20% of the mean thickness, for example, 90% of the GO layer has a thickness of within 10% of the mean thickness, 90% of the GO layer has a thickness of within 5% of the mean thickness, 95% of the GO layer has a thickness of within 10% of the mean thickness, 95% of the GO layer has a thickness of within 5% of the mean thickness or 98% of the GO layer has a thickness of within 5% of the mean thickness.

In some embodiments, the GO layer comprises multiple GO laminates. In some embodiments, the laminates have an interlayer spacing of from about 4 Å to about 15 Å, for example, from about 5 Å to about 12 Å, from about 5 Å to about 10 Å, from about 6 Å to about 12 Å, from about 6 Å to about 10 Å, from about 7 Å to about 12 Å, from about 7 Å to about 10 Å, from about 7 Å to about 9 Å, from about 7.5 Å to about 9 Å, from about 8 Å to about 9 Å, from about 8 Å to about 8.5 Å or about 8.25 Å. The spacing between two layers in a GO laminate structure may be determined using XRD (see, for example, spectra shown in FIG. 3(c)).

In some embodiments, the graphene oxide, or at least a portion thereof, is bound to the membrane body via a crosslinking agent. As used herein, "crosslinking agent" refers to a $C_{2-20}$ linear or branched alkyl, alkenyl or alkynyl group, especially an alkyl group, substituted towards one end with a functional group capable of bonding, preferably covalently, to PVDF, PTFE or nitrocellulose, and substituted towards another end with a functional group capable of bonding, preferably covalently, to graphene oxide. In some embodiments, the graphene oxide, or at least a portion thereof, is covalently bound to the membrane body via a crosslinking agent. In some particular embodiments, the graphene oxide is in the form of a layer and the graphene oxide layer is bound to the membrane body via a crosslinking agent.

In some embodiments, the crosslinking agent is a linear $C_{2-6}$ alkyl group substituted towards a first end with a first functional group capable of bonding, preferably covalently, to PVDF, PTFE or nitrocellulose, and substituted towards a second end with a second functional group capable of bonding, preferably covalently, to graphene oxide. In some embodiments, the crosslinking agent has a first functional group selected from —OH, —CHO and —COOH. In some embodiments, the crosslinking agent has a second functional group selected from —OH, —CHO and —COOH. As will be appreciated, these functional groups will bond, preferably covalently, with either the GO or the membrane body such that the crosslinking species bonding the GO and the membrane body (i.e. the bonded crosslinking agent) is technically a derivative of the crosslinking agent. For example, the —OH of a diol may bond with a carbon of the membrane body and/or GO to form an ether or ester functional group.

In some embodiments, the crosslinking agent is a diol, dialdehyde or diacid, preferably having between 2 and 6 contiguous carbon atoms with the relevant functional groups at or towards opposite ends. In some embodiments, the crosslinking agent is a diol. In other embodiments, the crosslinking agent is a dialdehyde. In yet other embodiments, the crosslinking agent is a diacid.

In some embodiments, the crosslinking agent is selected from 1,6-hexanediol, 1,5-pentanediol, 1,4-butanediol, 1,3-propanediol, 1,2-propanediol (propylene glycol), 1,2-ethanediol (glycol), glutaraldehyde (1,5-pentanedial), especially 1,5-pentanediol, glutaraldehyde and glycol, more especially pentanediol.

It is surprising that a PVDF membrane may be functionalized in such a way (i.e. by bonding to GO and crosslinking with a cross-linking agent) as PVDF is generally thought to be appreciably inert. Similar difficulties have also hampered the development of functionalized PTFE and nitrocellulose membranes previously.

Advantageously, the mechanical properties of many PVDF, PTFE and nitrocellulose membranes are desirable and may, in some embodiments, be superior to the mechanical properties of PAI, making them useful in the composite membranes of the present disclosure. Notable mechanical properties of graphene oxide include tensile strength, flexibility, and shear strength. Furthermore, the exfoliation resistance of pentanediol cross-linked graphene oxide on PVDF hollow fiber membrane was assessed to be higher than the PEI cross-linked graphene oxide on PAI hollow fiber membrane.

In some embodiments, the cross-linking agent (e.g. pentanediol) is almost entirely bound and therefore not liberated in water after being cross-linked with graphene oxide and PVDF. In such embodiments, contamination of the filtered water by the crosslinking agent can be minimized.

In some embodiments, the composite membrane disclosed herein has a high water flux, for example, from about $5 \, l \, m^{-2} \, h^{-1} \, bar^{-1}$ to about $100 \, l \, m^{-2} \, h^{-1} \, bar^{-1}$, for example, from about 10 to about 100, from about 20 to about 100, from about 30 to about 100, from about 40 to about 100, from about 50 to about 100, from about 60 to about 100, from about 70 to about 100, from about 80 to about 100, from about 90 to about 100, from about 40 to about 90, from about 40 to about 80 or from about 60 to about $80 \, l \, m^{-2} \, bar^{-1}$. In some embodiments, the water flux of the composite membrane is within 10% of the water flux of the membrane absent the GO (i.e. the water flux is within 10% of the porous membrane body).

In some embodiments, the composite membrane disclosed herein is selective in removing NOM from water contaminated with NOM. In this context, "selective" refers to the high rejection ratio of NOM. In some embodiments, the composite membrane may provide the removal of NOM but allow the passage of dissolved minerals. In other embodiments, the composite membrane may provide the simultaneous removal of NOM and dissolved minerals, such as $CaCO_3$.

In some embodiments, the composite membrane disclosed herein is resistant to biofouling. In some embodiments, the composite membrane disclosed herein resists, at least to some extent, the growth and/or accumulation of microorganisms, plants, algae, or animals on the composite membrane. In this regard, GO is reported to possess antibiofouling properties (Hegab et al.; Single-Step Assembly of Multifunctional Poly(tannic acid)—Graphene Oxide Coating To Reduce Biofouling of Forward Osmosis Membranes; *ACS Appl. Mater. Interfaces* 2016, 8, 27, 17519-17528). It is believed that, since NOM is generally negatively charged, the outer surface of the graphene oxide may resist or otherwise impede the entry of NOM into the GO, which may impart anti-biofouling properties.

Also disclosed herein is an array comprising two or more composite membranes arranged in parallel (as opposed to in series), the two or more composite membranes being composite membranes as disclosed herein. In such embodiments, the composite membranes are arranged such that the fluid to be filtered, typically water comprising NOM, flows simultaneously through two or more composite membranes. In some particular embodiments, the two or more composite membranes arranged in parallel are two or more composite hollow fiber membranes arranged in parallel.

In a further aspect, the present disclosure provides a method of preparing a composite membrane. The method comprises:
(a) providing a porous polyvinylidene fluoride (PVDF), polytetrafluoroethylene (PTFE) or nitrocellulose membrane body; and (b) filtering a dispersion comprising graphene oxide through the membrane body such that the continuous phase of the dispersion passes through a surface of the membrane body, thereby depositing graphene oxide on the surface of the membrane body.

In some embodiments, the continuous phase of the dispersion is urged through the surface of the membrane body by means of a positive pressure on the dispersion side of the membrane. In other embodiments, the continuous phase of the dispersion is urged through the surface of the membrane body by means of a negative pressure on the permeate side of the membrane, for example, at or around a vacuum pressure (e.g. 0.83 atm or 85 kPa). A combination of positive pressure on the dispersion side and negative pressure on the permeate side of the membrane may be employed.

In some embodiments, the dispersion comprising graphene oxide comprises about 0.005 mg/ml to about 5 mg/ml GO, for example about 0.01 mg/ml to about 1 mg/ml, about 0.05 mg/ml to about 0.5 mg/ml, about 0.1 mg/ml to about 0.3 mg/ml or about 0.1 mg/ml to about 0.2 mg/ml. In this context, "mg/ml" refers to mg of the graphene oxide per ml of the total dispersion (including the graphene oxide and the continuous phase).

In some embodiments, the continuous phase of the dispersion comprising graphene oxide is aqueous. The term "aqueous" in this context refers to a continuous phase in which water is the only continuous phase or is at least 50% by weight of the total continuous phase in the dispersion. In some embodiments, the continuous phase of the dispersion comprising graphene oxide is an alcohol, for example, methanol, ethanol, propanol, butanol or mixtures thereof, especially ethanol, methanol or a mixture thereof. In some embodiments, the continuous phase of the dispersion comprises at least 50% v/v alcohol (e.g. at least 60% v/v, at least 70% v/v, at least 80% v/v, at least 90% v/v, at least 95% v/v, at least 99% v/v, at least 99.5% v/v or at least 99.9% v/v alcohol). In some embodiments, the continuous phase of the dispersion comprising graphene oxide is an aqueous alcohol phase. In some particular embodiments, the continuous phase of the dispersion comprising graphene oxide comprises at least 50% v/v ethanol, at least 90% v/v or at least 95% v/v ethanol.

In some embodiments, the graphene oxide is prepared from graphite by Hummers' method (Hummers, W. S.; *J. Am. Chem. Soc.* 1958, 80, 6, 1339). In some embodiments, the graphene oxide prepared from graphite by Hummers' method is in the form of a graphene oxide dispersion which is used directly. In other embodiments, the graphene oxide prepared from graphite by Hummers' method is diluted with a continuous phase (e.g. water and/or an alcohol) to provide the graphene oxide dispersion.

In some embodiments, the thickness of the GO disposed on the surface of the membrane body is controlled by adjusting the concentration of the GO dispersion. In some embodiments, the thickness of the GO disposed on the surface of the membrane body is controlled by adjusting the volume of the GO dispersion filtered through the membrane body.

In some embodiments, the method further comprises an additional step, step (a1), before step (b) in which the porous membrane body is treated with a solvent. In some embodiments, the solvent treatment is to activate the membrane body, for example by cleaning the membrane body, wetting the membrane body and/or opening the pores of the membrane body. In some embodiments, the solvent treatment is to remove any protective coating that may be present in or on the membrane body. In this regard, many PVDF, PTFE and nitrocellulose membranes are typically supplied having a protective coating in and/or on them to aid in the stability of the membranes after manufacture. For example, PVDF membranes are commonly supplied with a poly(methyl methacrylate) (PMMA) coating layer, which can protect the membrane from contaminants (e.g. dust) which may block the pores, or may prevent direct exposure of the membrane to the atmosphere or other agents that may degrade the membrane. In some embodiments, the solvent in step (a1) is acetone, chloroform, an alcohol, an aqueous alcohol or a mixture thereof. In some embodiments, the solvent in step (a1) is an alcohol solvent, for example, methanol, ethanol, propanol, butanol or a mixture thereof, especially ethanol. In some embodiments, the solvent in step (a1) is an aqueous alcohol solvent, comprising water and an alcohol, wherein the alcohol is at least 1% v/v of the solvent, for example, about 1% v/v to about 99.5% v/v alcohol, about 2% v/v to about 99% v/v alcohol, about 5% v/v to about 95% v/v alcohol, about 10% v/v to about 90% v/v alcohol, about 20% v/v to about 80% v/v alcohol, about 30% v/v to about 70% v/v alcohol or about 40% v/v to about 60% v/v alcohol. In some particular embodiments, the solvent in step (a1) is an aqueous alcohol solvent, comprising about 40 to about 60% v/v alcohol, especially ethanol, and about 40 to about 60% v/v water, more especially about 50% v/v ethanol in water. In other particular embodiments, the solvent in step (a1) is an aqueous alcohol solvent, comprising about 2 to about 10% v/v alcohol, especially ethanol, and about 98 to about 90% v/v water, more especially about 5% v/v ethanol in water. In some embodiments, the porous membrane body is rinsed in the solvent. In some embodiments the porous membrane body is soaked in the solvent for a period of time, for example, at least 2 hr, at least 12 hr, at least 1 day or at least 2 days, typically up to about 3 days.

In some embodiments, the method further comprises an additional step, step (a2), after step (a), or step (a1) when included, and before step (b), in which the porous membrane body is contacted with a crosslinking agent. In such embodiments, the crosslinking agent bonds, preferably covalently, to the surface of the porous membrane body to form a functionalized surface. Then, during step (b), the GO is able to bond to the functionalized surface, preferably covalently, via the crosslinking agent. The result is that the GO can thereby be bound, preferably covalently, to the surface of the membrane body via the crosslinking agent. In other words, the GO may be crosslinked, preferably covalently, to the membrane body, forming a crosslinked composite membrane, preferably a covalently crosslinked composite membrane. The crosslinked composite membranes display many advantages, such as enhanced stability compared to a non-crosslinked composite membrane.

In step (a2), contact is made with a crosslinking agent. This contact may be any means which brings the crosslinking agent into contact with the porous membrane body. In some embodiments, the crosslinking agent is in solution and the solution contacts the porous membrane body. In such embodiments, the solute may be aqueous, alcohol or an aqueous alcohol. The term "aqueous" in this context refers to a solution in which water is the only solvent or is at least 50% by weight of the total solvents in the solution. The alcohol may be methanol, ethanol, propanol, butanol or a mixture thereof, especially ethanol. In some embodiments, contact is made by soaking the porous membrane body in the crosslinking agent or solution comprising the crosslinking agent. In some embodiments, contact is made by passing the crosslinking agent or solution comprising the crosslinking agent through the porous membrane body.

Also disclosed herein is a composite membrane prepared by the method as disclosed herein.

In a further aspect, the present disclosure provides a method of removing NOM from NOM-contaminated water, or water suspected of being contaminated with NOM. The method comprises passing the NOM-contaminated water, or water suspected of being contaminated with NOM, through a composite membrane as set forth herein. As will be appreciated, this method may be described as a method of providing NOM-free or NOM-reduced water from NOM-contaminated water, or water suspected of being contaminated with NOM, the method comprising passing the NOM-contaminated water, or water suspected of being contaminated with NOM, through a composite membrane as set forth herein. In some embodiments, the passage of water through the composite membrane is promoted by gravity. In some embodiments, the passage of water through the composite membrane is promoted by a pressure difference. For example, the pressure difference may be provided by a high pressure (e.g. >1 to 20 bar) on the source side and/or a low pressure (e.g. 0.1 to <1 bar) on the permeate side. A person skilled in the art can readily determine the appropriate pressures to use depending on the system.

In a further aspect, the present disclosure provides a method of functionalizing a PVDF membrane. The method comprises contacting a PVDF membrane with a solvent comprising at least 2% v/v ethanol, at least 5% v/v ethanol, at least 20% v/v ethanol, at least 50% v/v ethanol, at least 80% v/v ethanol, at least 90% v/v ethanol, at least 95% v/v ethanol or at least 98% v/v ethanol. Without wishing to be bound by theory, it is believed that upon contact with ethanol, the pores of PVDF membranes are cleaned, wetted and/or opened, thus increasing their reactivity, making their functionalization more facile.

In a further aspect, the present disclosure provides a method of depositing graphene oxide onto a permeable solid support, such as a filtration membrane. The method comprises:

(a) providing a permeable solid support; and (b) filtering a dispersion comprising graphene oxide through the permeable solid support such that the continuous phase of the dispersion passes through a surface of the permeable solid support, thereby depositing graphene oxide on the surface of the permeable solid support, wherein the continuous phase of the dispersion comprises at least 50% v/v, at least 90% v/v, at least 95% v/v or at least 99% v/v ethanol.

Also disclosed herein is a method of removing NOM from NOM-contaminated water, or water suspected of being contaminated with NOM, the method comprising passing the NOM-contaminated water, or water suspected of being contaminated with NOM, through graphene oxide disposed on a surface of a membrane body, especially wherein the membrane body is a porous polyvinylidene fluoride (PVDF), polytetrafluoroethylene (PTFE) or nitrocellulose membrane body.

EXAMPLES

PVDF, PTFE and nitrocellulose are not usually considered suitable for coating. However, in Examples 1 to 7 described below, it was shown to be possible to obtain GO-coated PVDF membranes. It is believed that PTFE and nitrocellulose are also appreciably chemically inert and therefore behave in a similar fashion to PVDF.

Example 1

Example 1 describes the manufacture of a composite membrane in the form of a graphene oxide membrane which comprises a polyvinylidene fluoride (PVDF) membrane coated with graphene oxide.

A graphene oxide (GO) dispersion was prepared by Hummers' method. In Hummers' method, graphite is oxidized to graphene oxide by a mixture of $H_2SO_4$, $KMnO_4$, and $NaNO_3$ under controlled temperature. FIG. 1 is a schematic representation of the process used to form a GO dispersion (also referred to as a GO suspension). The C/O ratio was determined by XPS to be 2.20.

The GO suspension was filtered through a PVDF membrane to deposit GO flakes on the PVDF membrane and form a GO layer on the PVDF membrane (i.e. a composite membrane in the form of a GO membrane). In this example, vacuum filtration was used to prepare a GO layer on PVDF with a pore size of 0.22 μm. The GO thickness could be tuned by changing the volume of the GO dispersion filtered through a given area of PVDF membrane.

A scanning electron microscope (SEM) was used to examine the surface morphology and structure of the graphene oxide on PVDF. X-Ray Diffraction (XRD) was used to assess changes in the crystallographic structure as well as to determine the interlayer spacing between laminate structure of the GO membrane. Exemplary results are shown in FIG. 3.

Figure 3:
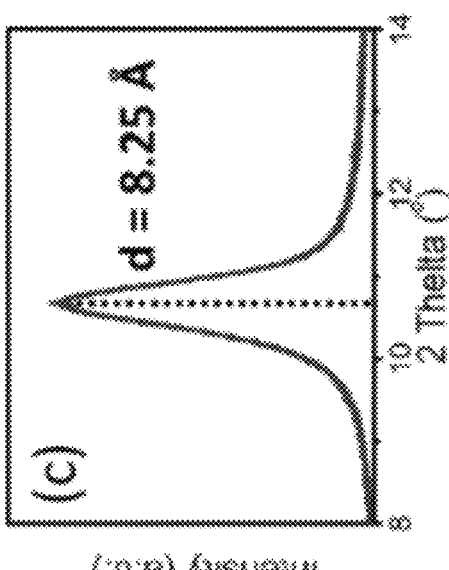
FIG. 3(a) is a SEM image showing the surface morphology of the surface of the GO coating described in Example 1.
FIG. 3(b) is a SEM image of a cross-section of the GO coating described in Example 1 and shows the laminar structure of the GO layer.
FIG. 3(c) is an XRD spectra, as described in Example 1, used to determine the interlayer distance of the GO sheets of the laminar structure within the GO layer (x-axis=2theta, y-axis=intensity (a.u.)).
Figure 3:
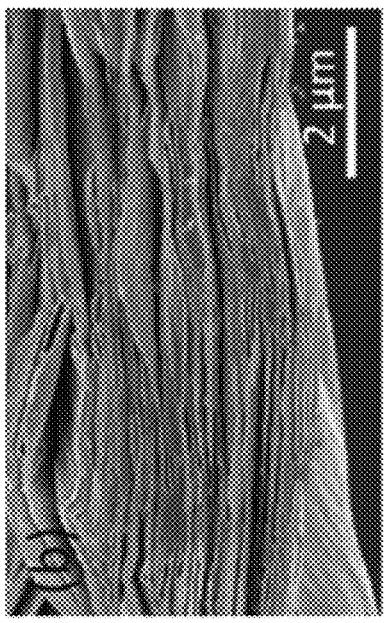
Figure 3:
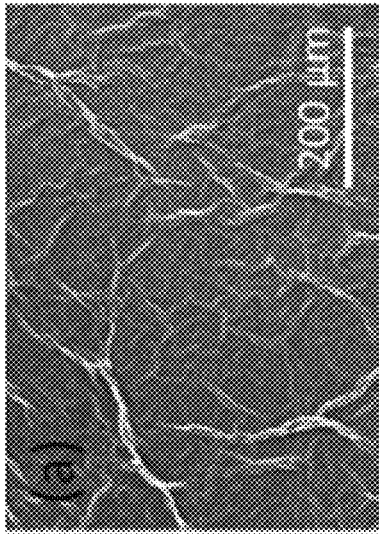

FIG. 3(*a*) is a SEM image showing the membrane surface morphology with wrinkle like regions indicating the folding of GO membrane. FIG. 3(*b*) illustrates a laminate structure within the GO membrane. The spacing between two layers in the GO laminate structure was determined to be 8.25 Å using XRD (spectra shown in FIG. 3(*c*)). The sharp peak at a 2θ value of 10.7° is indicative of a d-spacing value of 8.25 Å for the layers.

Samples of filtered water from Sydney Water's Nepean Water Filtration Plant were used for water filtration experiments. The filtered water was the product of the standard water treatment process at the plant, namely coagulation with $FeCl_3$ and a cationic poly-DADMAC followed by filtration in deep bed filters. The concentration of NOM was determined by the dissolved organic carbon (DOC) and a highly sensitive liquid chromatography-organic carbon detection (LC-OCD).

Figure 2:
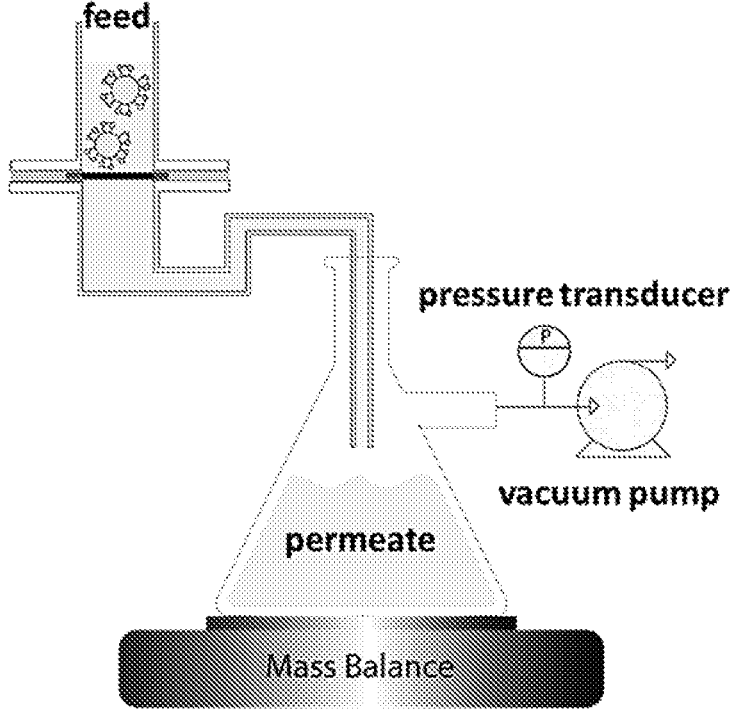
FIG. 2 is a schematic diagram showing the filtration set-up used in Example 1 and shows pressure-controlled water flux measurement.

The experimental setup is shown schematically in FIG. 2. As shown in FIG. 2, a pressure-controlled filtration method was used to determine the water flux. The applied pressure P during filtration was controlled at ~1.0 bar while storing the permeate in a container kept on a mass balance. GO membranes having an average effective area of ~3.0 cm² were used for the filtration experiments in this example.

Figure 4:
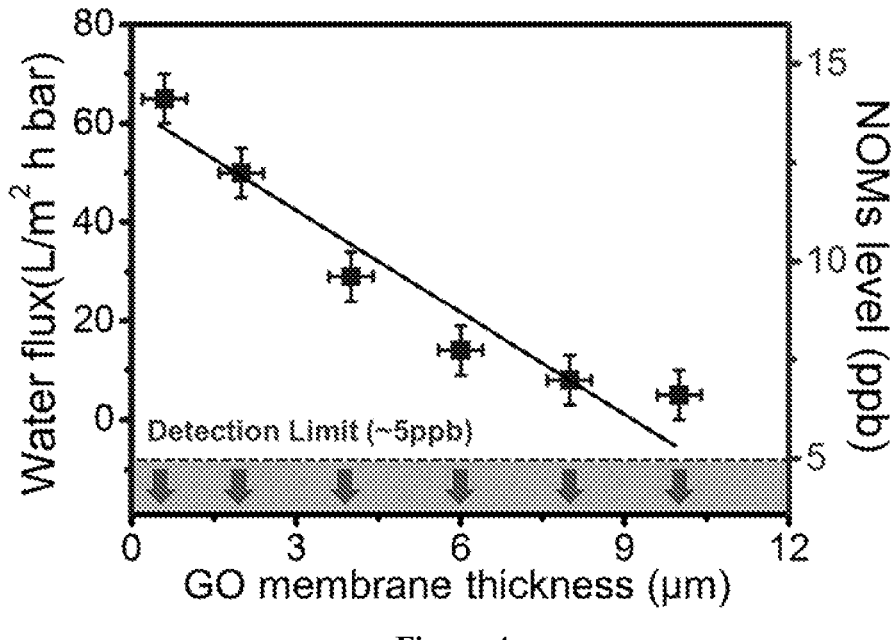
FIG. 4 is a graphical representation of the results of flux testing of composite membranes having different GO thicknesses as described in Example 1, using a feed solution containing 5 mg/ml NOM in water. In the graph, water flux (in $l\,m^{-2}\,h^{-1}\,bar^{-1}$) is on the left y-axis, GO layer thickness (in $\mu m$) is on the x-axis and NOM level of the filtered water (in ppb) is on the right y-axis. The graph shows that, in each case, the NOM level is below the detection limit (5 ppb) of the LC-OCD technique used.

Based on the result of DOC and LC-OCD, the NOM concentration in the feed side was 5 mg/ml. Contrastingly, there was no trace of the tested species in the permeate side, as determined by absorption spectroscopy, which suggests that the permeate contains no NOM species, or at least below the detection limit of the LC-OCD technique, which is 5 ppb (0.005 mg/ml). The results are shown in FIG. 4.

Once it had been determined that all NOM was effectively removed from water using the GO membrane, water flux measurements were examined at a constant pressure of ~1.0 bar from the permeate side (for the avoidance of doubt, the permeate side is shown in FIG. 2).

The amount of water passing through the GO membrane was measured with time. Each experiment was repeated more than three times. The water flux values shown in FIG.

4 are the average water flux values for an experiment with deviation. As expected, thicker GO membranes have lower water flux as thicker graphene oxide membranes have longer paths for water transport through the membrane. Water flux was estimated using the equation:

$$J_w = \frac{Q}{AP\Delta t}$$

where $J_w$ is water flux; Q is water volume; A is the GO membrane effective area; P is vacuum pressure, and $\Delta t$ gives the time.

Figure 5:
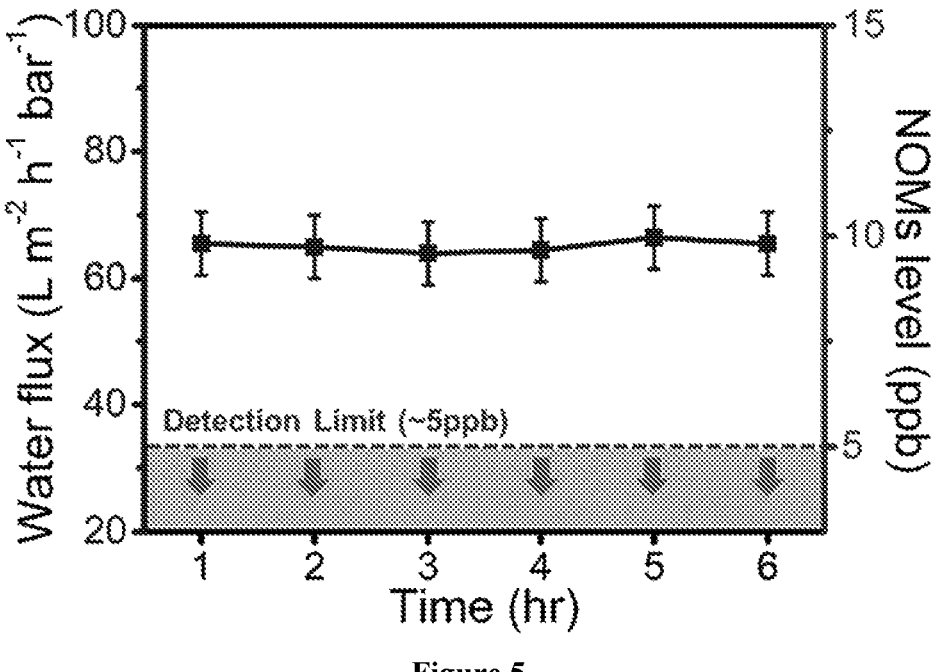
FIG. 5 is a graphical representation of the results of flux testing of composite membranes over various lengths of time to assess their stability, as described in Example 1. These results were obtained using a composite membrane having a GO layer thickness of <1 mm and a feed solution containing 5 mg/ml NOM in water. In the graph, water flux (in $l\,m^{-2}\,h^{-1}\,bar^{-1}$) is on the left y-axis, time (in h) is on the x-axis and NOM level of the filtered water (in ppb) is on the right y-axis. The graph shows that in each case, the NOM level is below the detection limit (5 ppb) of the LC-OCD technique used.

To check the stability of water flux over time, a GO membrane having a GO layer with a thickness of <1 mm was used for filtration testing with 5 mg/L DOC on the feed side. The results are summarised in FIG. 5 (water flux vs. time), which clearly indicate the suitability of the PVDF/GO composite membrane for water purification where constant flux over a long period is achieved. The flow speed of the peristaltic pump was kept below 50 ml/min.

Example 2

Example 2 describes the manufacture of a composite membrane in the form of a GO-coated hollow fiber membrane (HFM). HFMs are a class of artificial membranes containing a semi-permeable barrier in the form of a hollow fiber. HFMs are prevalent in water treatment plants, desalination plants, cell culture, medicine, and tissue engineering. There exist commercially available cartridges which comprise a number of hollow fibers. These can be used for a variety of liquid and gas separations.

Compared to flat sheet membranes, hollow fiber membranes hold several advantages, including a high energy efficiency in achieving complete mixing in modules, a larger membrane surface area per module unit volume and a self-supporting structure which does not require the use of permeate and feed spacers. The pore size of commercially available HFMs typically ranges from 0.10.2 μm. The excellent mass-transfer properties lead to numerous commercial applications such as ultrafiltration (UF) and microfiltration (MF).

In this experiment, a polyvinylidene fluoride (PVDF) HFM was used. PVDF HFMs are reported to be hydrophilic. The PVDF HFM was wetted before being used in water treatment, which is believed to be beneficial for membrane structure stability.

Figure 6:
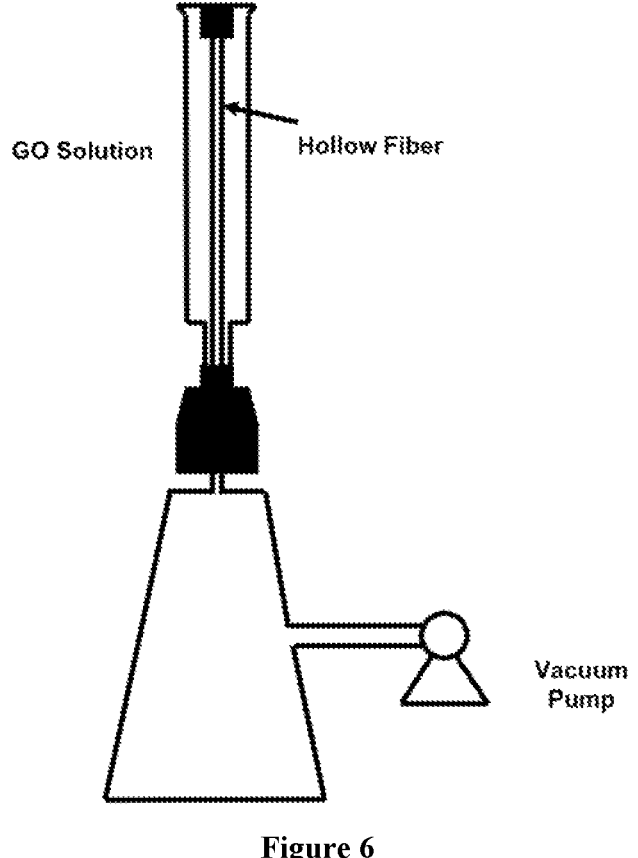
FIG. 6 is a schematic diagram showing the set-up used in Example 2 to prepare GO-coated HFMs.

A syringe housing a single HFM was used in this experiment; the setup is depicted in FIG. 6. The syringe houses a single HFM which was glued, at one end, into the tip of the syringe with epoxy glue. The syringe was then connected to a vacuum flask. A GO dispersion (as described above in Example 1) was placed in the syringe on the outer side of the HFM. A vacuum was then applied to the flask (at a vacuum pressure of 85 kPa), to draw fluid through the HFM, which deposited a GO coating on the outer surface of the HFM. Using this method, it was easy to control the degree of coating (i.e. GO thickness) by altering the concentration of the GO dispersion.

Due to the manufacturing process, the surfaces of commercially available HFMs are typically covered with for a protective coating protecting the HFM. It is believed that the protective coating has a detrimental effect to the coating process disclosed herein. Accordingly, before use in the experiment above, the protective coating was removed (or at least removed to a sufficient extent) by immersing the PVDF HFM in ethanol for at least a day. In this regard, 30 ml of 50% v/v aqueous ethanol solution for a $1.2 \times 10^{-4}$ m$^2$ hollow fiber membrane proved sufficient.

Figure 7A:
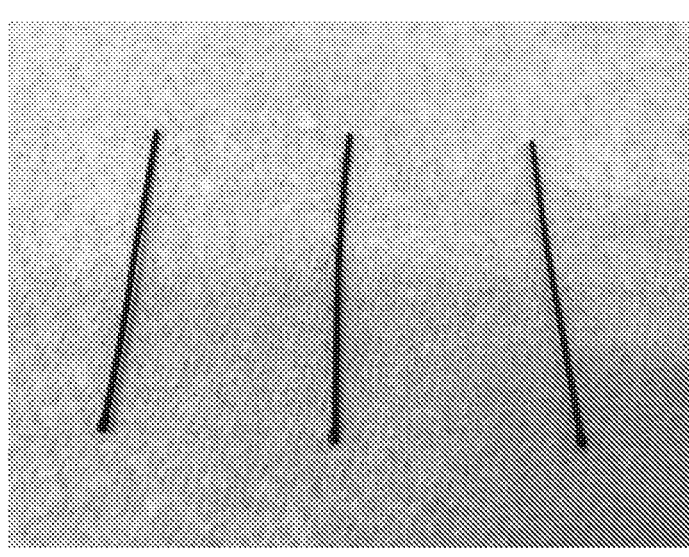
FIG. 7(a) is a photographic image of a GO-coated HFM as prepared in Example 2.
Figure 7B:
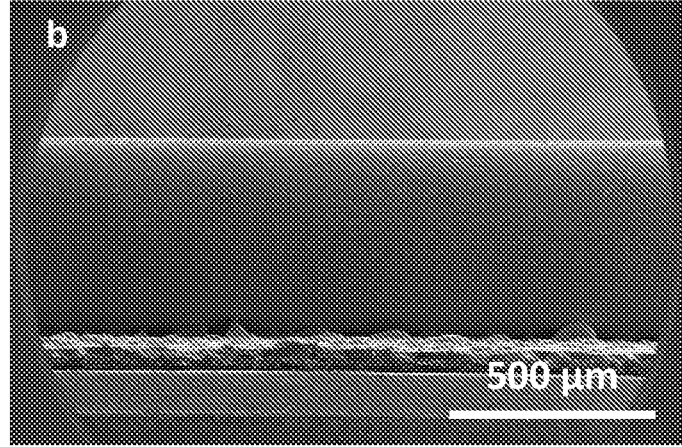
FIG. 7(b) is an SEM image of a GO-coated HFM as prepared in Example 2 and shows the substantially uniform GO-coating obtained in Example 2 (scale bar=500 $\mu m$).
Figure 8A:
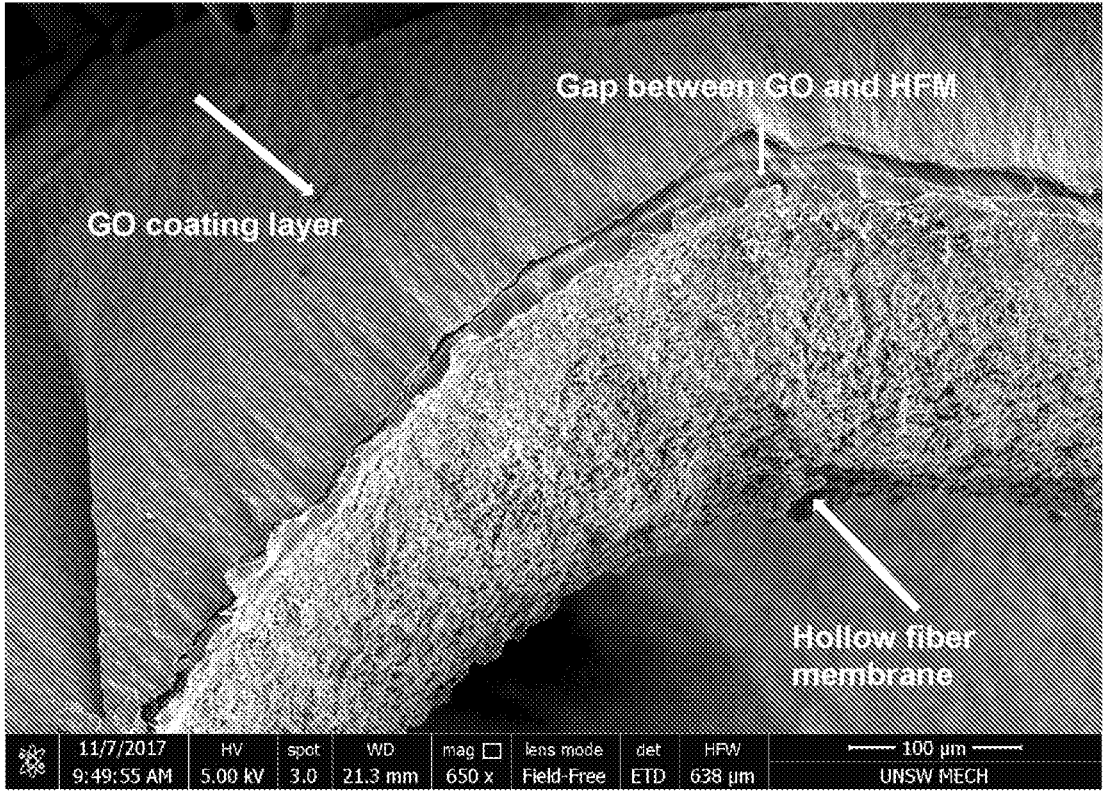
FIG. 8(a) is an SEM image of a GO-coated HFM as prepared in Example 2 and shows that there are some gaps between the GO layer and the outer surface of the HFM (scale bar=100 $\mu m$).
Figure 8B:
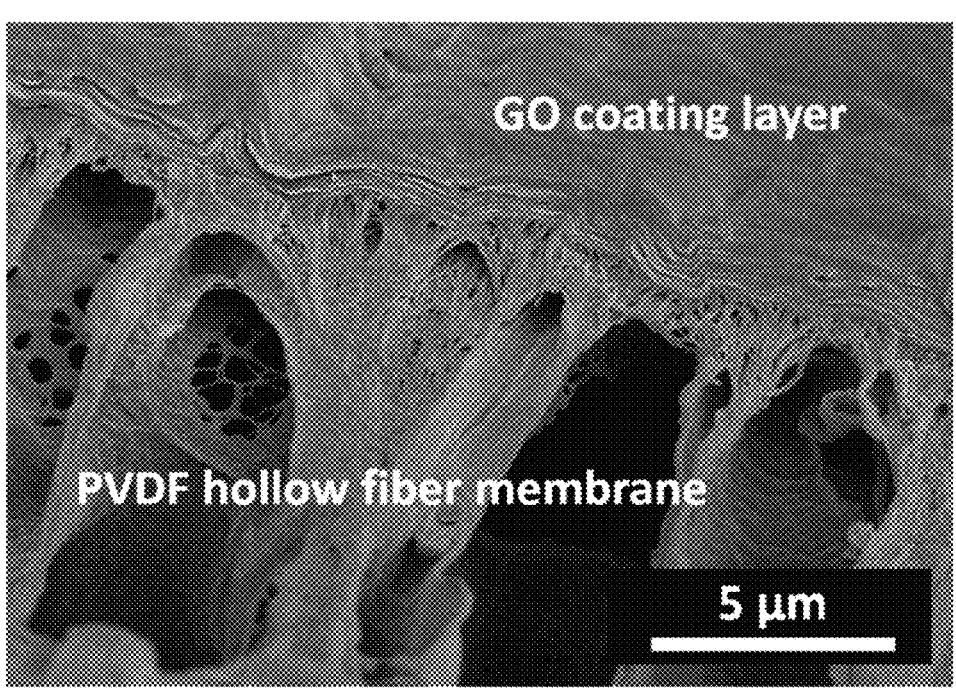
FIG. 8(b) is an SEM image of a GO-coated HFM as prepared in Example 2 (scale bar=5 $\mu m$).

A 0.15 mg/ml dispersion of GO in water was used to deposit GO on the HFM that had been soaked in aqueous ethanol. Before the coating step, the HFM was cleaned to remove any residual ethanol. The cleaning step typically involved washing in water with an optional further step of rinsing the membrane with additional water (e.g. drawing additional water through the membrane to further rinse the membrane). The coating process typically lasted for several hours. During this time, it was important that the HFM was completely immersed in the GO dispersion and was held without contacting with the wall of the syringe. For a 9 cm length of a HFM having an external diameter of 1.5 mm, about 25 to 30 ml of the GO dispersion was used. This could be reduced to about 10 to 15 ml if a shorter length (about 5 cm) HFM was used. After the coating was finished, the GO-coated HFM was immersed in DI water for storage as the PVDF HFM should be stored in a humid state to maintain the full function of pores. Importantly, the GO coating was stable in DI water. FIG. 7 shows images of the GO-coated PVDF HFM made by this method. FIG. 8 is an SEM image of the GO-coated HFM prepared in Example 2. The image shows that there are some gaps between the GO layer and the outer surface of the HFM.

Example 3

Figure 9A:
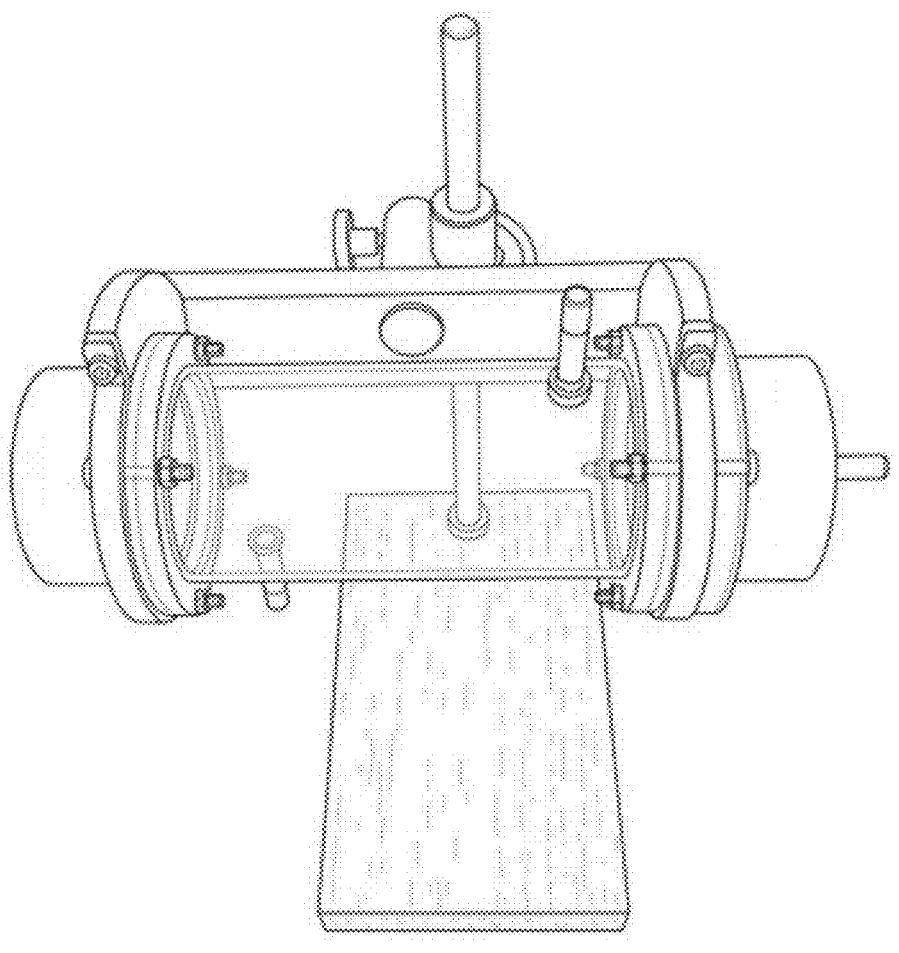
FIG. 9(a) is a photographic image of the apparatus used in Example 3 to prepare multiple GO-coated HFMs simultaneously in parallel.
Figure 9B:
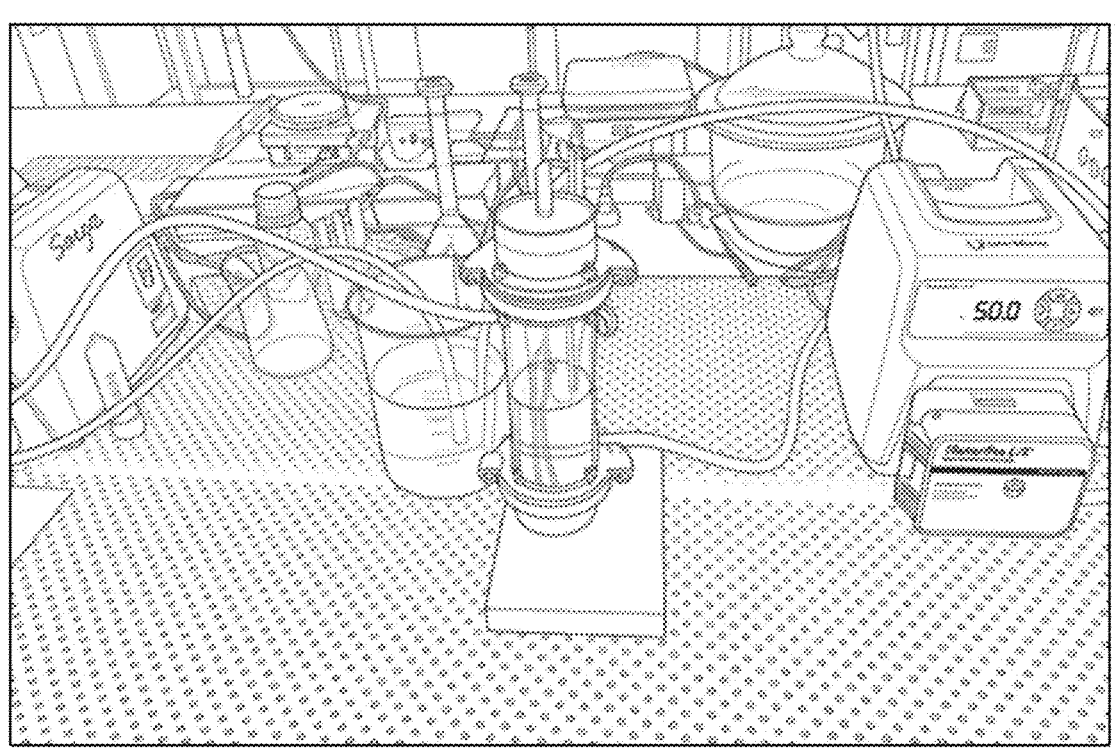
FIG. 9(b) is a photographic image of the apparatus shown in FIG. 9(a) in use.
Figure 9C:
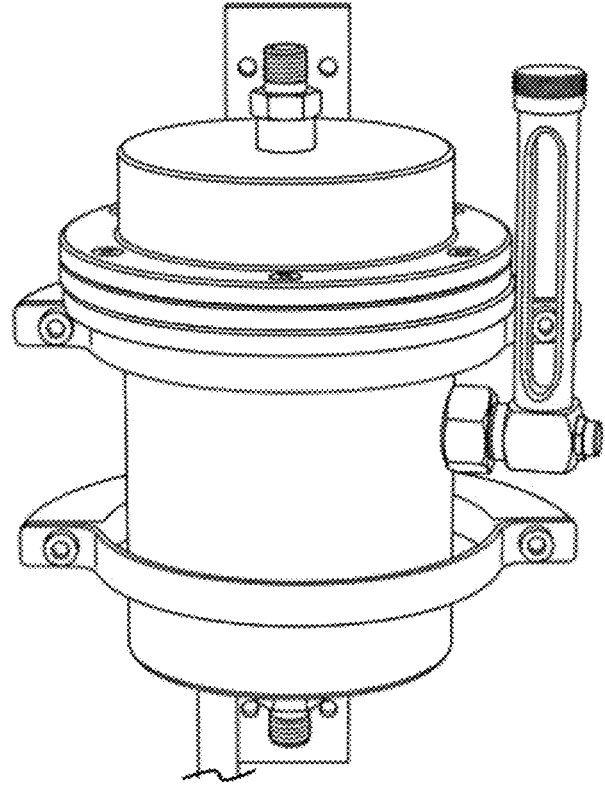
FIG. 9(c) is a photographic image of an alternate apparatus used in Example 3 to prepare multiple GO-coated HFMs simultaneously in parallel.
Figure 9D:
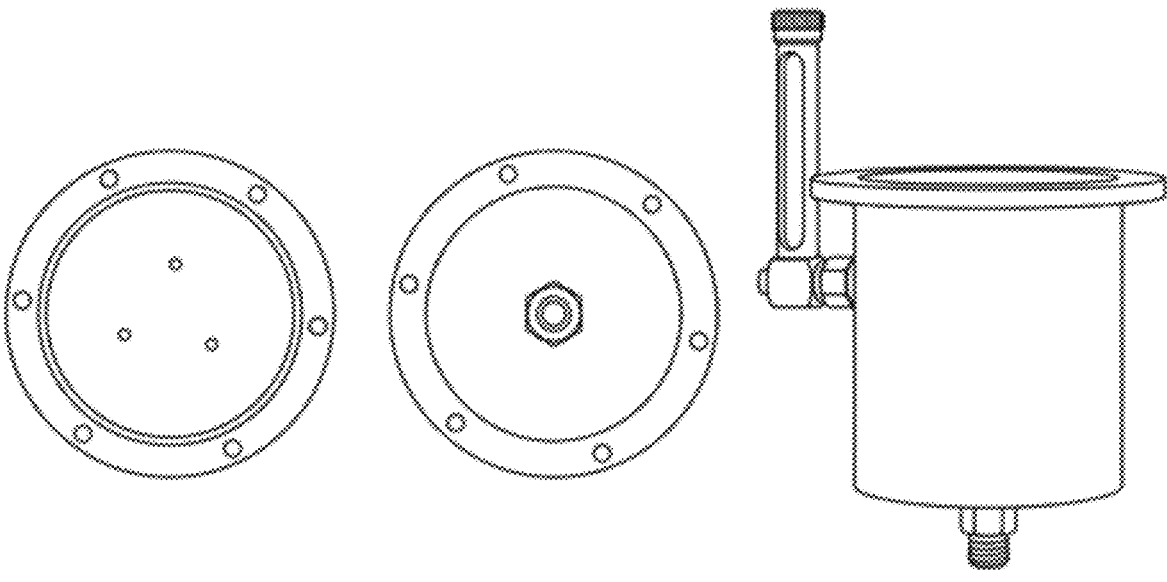
FIG. 9(d) is a photographic image of the apparatus shown in FIG. 9(c) in a disassembled state.

In Example 3, a process similar to Example 2 was used to produce multiple GO-coated PVDF HFMs simultaneously. In Example 3, multiple HFMs were connected in parallel using the apparatus shown in FIGS. 9(a) and 9(b), which allowed the simultaneous production of multiple GO-coated PVDF HFMs. An alternate apparatus (shown in FIGS. 9(c) and 9(d)) could also be used for this process. In the apparatus shown in FIGS. 9(c) and 9(d), the GO coated HFMs are fixed over the holes in the middle plate using epoxy glue (left part in FIG. 9(d)). This middle plate is installed by screws between the feed chamber (right part in FIG. 9(d)) and the permeate chamber (middle part in FIG. 9(d)) as shown in FIG. 9(c), with O-rings in between each part (middle plate and feed chamber, middle plate and permeate chamber). At this stage, the GO coated HFMs are placed in the feed chamber. The small tube on the feed chamber works as a water level indicator to ensure the complete filling of NOM-contaminated water in the feed chamber. Both the feed chamber and permeate chamber are connected with the tube fitting units (top part of the permeate chamber and bottom part of the feed chamber in FIG. 9(c)). Each of the units is connected with a pressure gauge and a peristaltic pump, in which the pressure gauge measures the feed/ permeate side water pressure and the peristaltic pump supplies/sucks water from feed/permeate side. The apparatus shown in FIGS. 9(a) and 9(b) operates in a similar fashion.

Example 4

In Example 4, GO-coated membranes were prepared in a manner similar to that described in Examples 1 and 2, yielding both a flat GO-coated membrane and a GO-coated HF membrane. In Example 4, instead of using a GO suspension in water, a GO suspension in ethanol was used to coat a PVDF disc membrane and a PVDF HFM. To obtain a GO suspension in ethanol, a concentrated GO suspension in water was first prepared via Hummers' method. The dispersion was then diluted with ethanol to yield a GO in ethanol dispersion having a concentration of 0.15 mg/mL (no efforts were made to remove the residual water remaining from Hummers' method). The diluted dispersion was then placed in an ultrasonicator for 10 hr to provide the GO ethanol dispersion/suspension (with trace amounts of water). Use of a GO suspension in ethanol allowed much faster deposition, with vacuum filtration speeds (during the deposition) becoming about 10 times faster. Furthermore, the laminar structure of the flat GO membrane was observed to be more uniform when using the GO ethanol dispersion than the GO water dispersion. Other coating properties could also be improved by using GO ethanol dispersion.

Example 5

Figure 10:
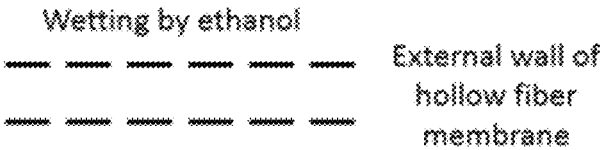
FIG. 10 is a schematic diagram showing the procedural steps used to prepare a GO-coated HFM, as described in Example 5.
Figure 10:
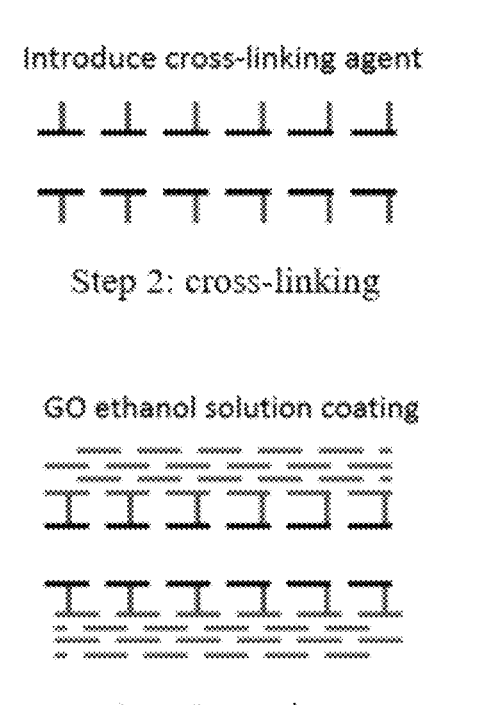
Figure 11:
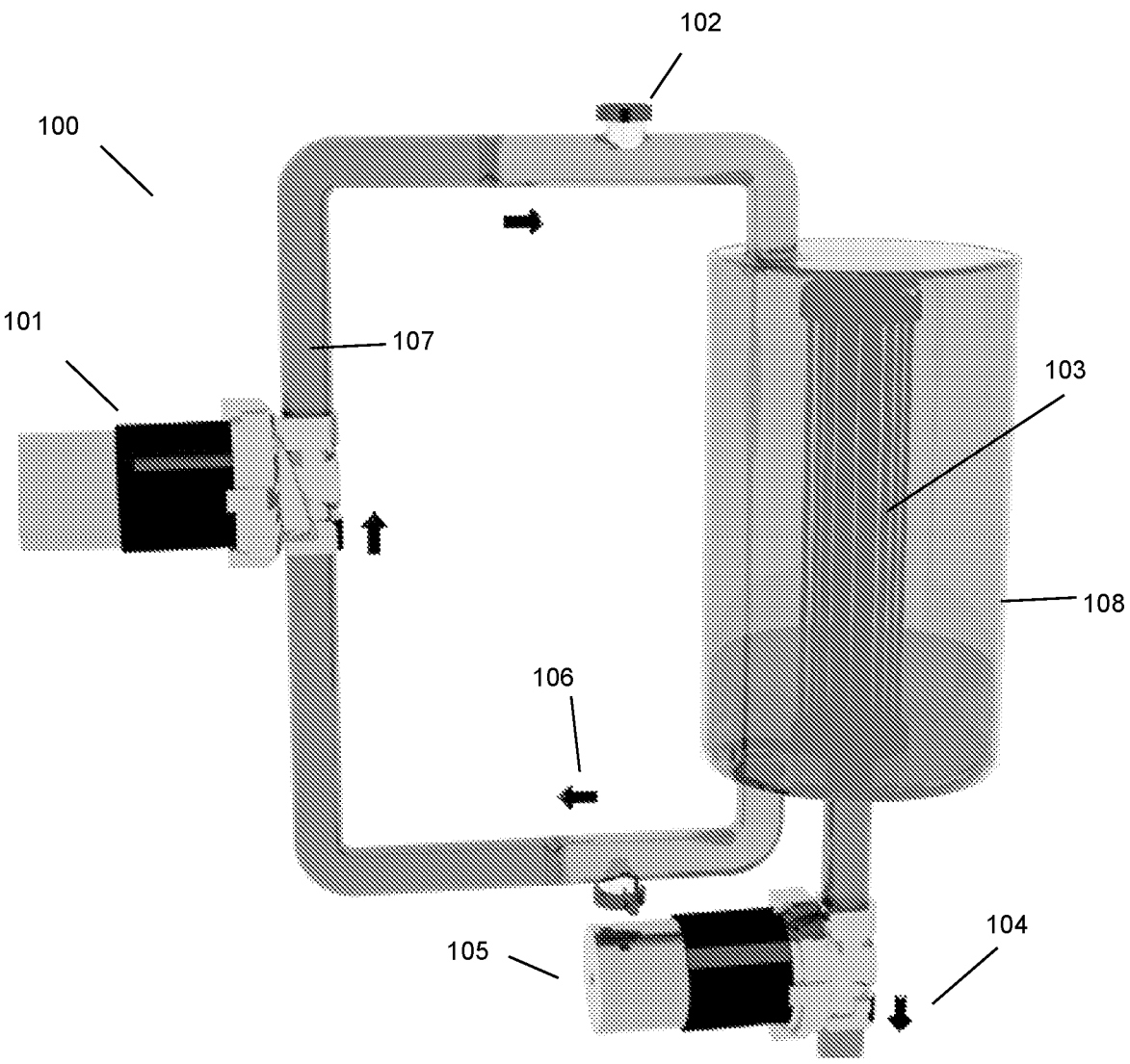
FIG. 11 is a schematic diagram showing the apparatus used in Example 7.

Example 5 describes the preparation of a cross-linked GO-coated PVDF HF membrane using pentanediol as a cross-linking agent on an apparatus analogous to that described in Example 2. Similar results were also obtained using the parallel setup described in Example 3. The key steps of the preparation are shown in FIG. 10.

In this example, the PVDF hollow fiber membrane is first immersed in absolute ethanol for at least 12 h to dissolve and remove the protective coating from the walls of the hollow fiber membrane present in the commercially available PVDF HFMs. After removing the ethanol, the PVDF HFM was completely immersed in an aqueous solution of pentanediol (20% v/v) for 48 h at room temperature without stirring. The HFM was then taken out and immersed in a graphene oxide/ethanol dispersion (0.15 mg/ml GO in ethanol). A negative pressure was applied at the permeate outlet side for 5 min. The excess graphene oxide dispersion was removed and the GO-coated HFM was stored open to the air at room temperature for surface drying and to desiccate the GO coating.

Example 6

Example 6 describes an alternate and generalised preparation method for preparing a cross-linked GO-coated PVDF HF membrane using pentanediol as a cross-linking agent.

PVDF wetting/activation—Immerse the PVDF hollow fiber in aqueous ethanol solution (5% v/v) for at least 2 hours. After the wetting process, the ethanol solution should be removed from the container and the surface of hollow fiber cleaned by rinsing with the ethanol solution several times, preferably with the same concentration as wetting.

GO coating—After the wetting procedure and removing ethanol, the pentanediol should be introduced as a cross-linking agent.

1. Remove the ethanol solution and fill the rig with the cross-linking agent (pentanediol).
2. Rinse the HFM in pentanediol solution for 24 hours.
3. Remove the pentanediol solution and fill with 0.15 mg/ml GO dispersion in ethanol (the concentration can be varied to adjust the thickness of the GO coating layer).
4. Rinse the HFM in the GO dispersion for 30 minutes (the coating time can be varied to adjust the thickness of the GO coating layer).

Drying—Drain the graphene oxide dispersion when coating is finished. Keep the graphene oxide coated hollow fiber membranes open to the air at room temperature for surface drying.

Example 7

An alternate rig design (100) is shown in FIG. 12. The rig 100 comprises:

a first pump 101, a NOM inlet 102,

HFMs 103 (either GO coated or uncoated), a permeate outlet 104, a second pump 105, a NOM outlet 106, solvent (e.g. ethanol, graphene oxide dispersion, NOM-contaminated water) 107, chamber 108.

The rig 100 can be used for either (i) fabrication of GO membranes or (ii) filtration of NOM once the fabrication of the GO membranes is complete.

This rig can be used to fabricate GO membrane using a method analogous to that described in Example 1 or Example 2. In the fabrication of GO membranes, the membranes 103 start as uncoated PVDF hollow fiber membranes. Pump 101 recycles the ethanol 107 used for wetting. When wetting is finished, negative pressure (e.g. vacuum) is provided by pump 105, to remove the ethanol from the system. After the wetting process, chamber 108 is filled with a graphene oxide dispersion for the coating process. Pump 105 can be used to pump the GO dispersion through the HFMs 103. When the coating process is finished, pump 105 can then be used to empty the chamber 108 and dry the membranes 103.

In the filtration of NOM, the membranes 103 are GO membranes. Briefly, pump 101 is used to provide NOM-contaminated water to the chamber 108, and the pump 105 operates on the permeate side to draw the water through the membranes 103 and thereby produce clean water on the outlet side 104.

It is to be understood that, if any prior art publication is referred to herein, such reference does not constitute an admission that the publication forms a part of the common general knowledge in the art, in Australia or any other country.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments.

The invention claimed is:

1. A method of preparing a composite membrane, the method comprising:

(a) providing a porous polyvinylidene fluoride (PVDF) membrane body;

(a1) contacting the porous PVDF membrane body with 1,5-pentanediol; and (b) filtering a dispersion comprising graphene oxide through the PVDF membrane body such that a continuous phase of the dispersion passes through a surface of the membrane body, thereby depositing graphene oxide on the surface of the PVDF membrane body.

2. The method according to claim 1, wherein the continuous phase of the dispersion comprising graphene oxide comprises at least 50% v/v ethanol.

3. The method according to claim 1, further comprising a step of treating the porous PVDF membrane body with a solvent to remove, completely or at least partially, any protective coating that may be present on the PVDF membrane body before step (a1).

4. The method according to claim 3, comprising immersing the PVDF membrane body in the solvent for at least 2 hours to remove, completely or at least partially, any protective coating.

5. The method according to claim 3, comprising immersing the PVDF membrane body in the solvent for at least 12 hours to remove, completely or at least partially, any protective coating.

6. The method according to claim 1, wherein step (a1) comprises immersing the porous PVDF membrane body in 1,5-pentanediol.

7. The method according to claim 1, wherein step (a1) comprises rinsing the porous PVDF membrane body with 1,5-pentanediol.

8. The method according to claim 1, wherein step (a1) comprises contacting the porous PVDF membrane body with 1,5-pentanediol for 24 hours.

9. The method according to claim 1, wherein step (a1) comprises contacting the porous PVDF membrane body with 1,5-pentanediol for 48 hours.

10. The method according to claim 1, further comprising a step of removing 1,5-pentandiol after step (a1) and before step (b).

* * * * *